(12) United States Patent
Bonnetain et al.

(10) Patent No.: US 8,789,898 B2
(45) Date of Patent: Jul. 29, 2014

(54) TRACKS FOR ALL-TERRAIN VEHICLES

(75) Inventors: Frédéric Bonnetain, Montigny le Bretonneux (FR); Yann Gendry, Laval (FR)

(73) Assignee: Nextar Systems, Roanne (FR)

( * ) Notice: Subject to any disclaimer, the term of this patent is extended or adjusted under 35 U.S.C. 154(b) by 419 days.

(21) Appl. No.: 13/039,947

(22) Filed: Mar. 3, 2011

(65) Prior Publication Data

US 2011/0221266 A1 Sep. 15, 2011

(30) Foreign Application Priority Data

Mar. 10, 2010 (FR) ..................... 10 00964

(51) Int. Cl.
*B62D 55/21* (2006.01)
*B62D 55/26* (2006.01)

(52) U.S. Cl.
USPC .......................................... 305/202; 305/203

(58) Field of Classification Search
USPC ......................................... 305/185, 202, 203
See application file for complete search history.

(56) References Cited

U.S. PATENT DOCUMENTS 1,724,961 A 8/1929 Penn
2,335,228 A 11/1943 Allen et al.
4,083,611 A * 4/1978 Schaffner et al. ............. 305/186
4,871,216 A * 10/1989 Cory ................................ 305/59
2002/0021047 A1 2/2002 Durick et al.

FOREIGN PATENT DOCUMENTS

EP 1 897 791 A2 3/2008
FR 1.217.147 5/1960

OTHER PUBLICATIONS

French Search Report in French Patent Application No. 1000964; dated Oct. 20, 2010 (with English-language translation).

* cited by examiner

*Primary Examiner* — Kip T Kotter
*Assistant Examiner* — Jean Charleston
(74) *Attorney, Agent, or Firm* — Oliff PLC (57) ABSTRACT

A track for an all-terrain vehicle, and namely for an armored vehicle, comprising links hinged together so as to form a closed chain, each link carrying at least one body equipped with a track shoe intended to come into contact with the ground, track wherein it incorporates a row of median bodies that is arranged so as to be longitudinally offset with respect to the row of lateral bodies, each median body being thus positioned staggered between four lateral bodies, each median body being further hinged, by means of at least two parallel pins, to four lateral bodies, that is to say two lateral bodies from each lateral row, the pins being positioned at an equal distance from one another.

15 Claims, 13 Drawing Sheets

Fig. 16

TRACKS FOR ALL-TERRAIN VEHICLES

BACKGROUND OF THE INVENTION

1. Field of the Invention

The technical scope of the invention is that of tracks for all-terrain vehicles and in particular for armored vehicles.

2. Description of the Related Art

Such tracks are well known to some skilled in the art. They are constituted by an assembly of links, hinged together, forming a closed chain winding around crown gear linked to the vehicle's motorization.

Figure 1:
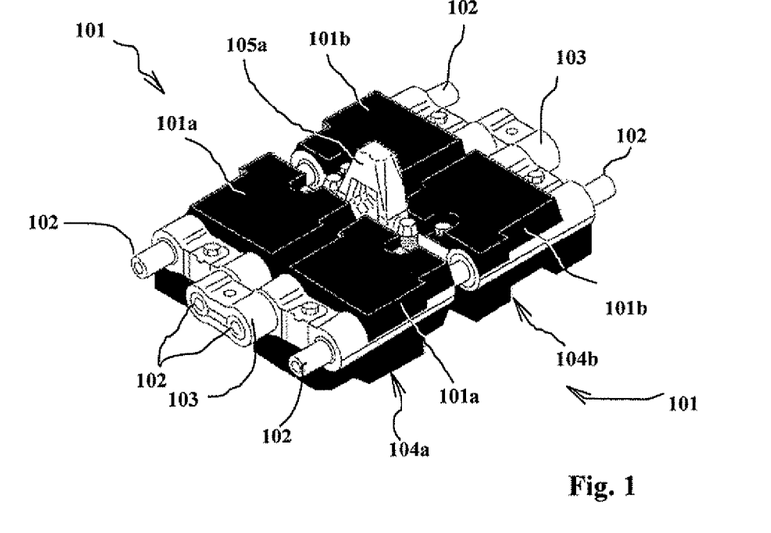
FIG. 1 shows an assembly of two links of a track according to prior art.
Figure 2:
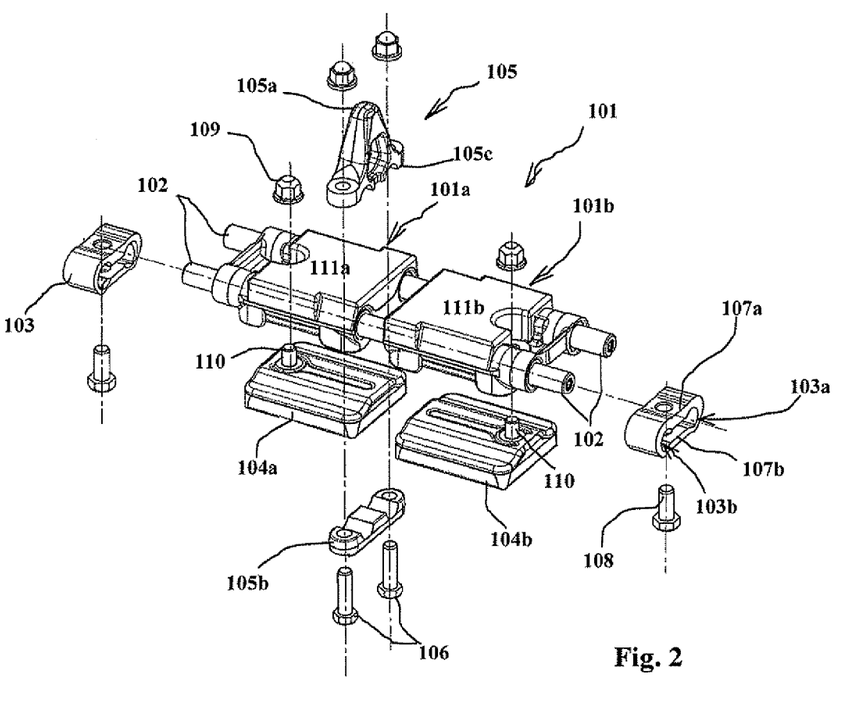
FIG. 2 shows an exploded view of the components of a track link according to prior art.

FIG. 1 thus shows an assembly of two links of a track according to prior art. FIG. 2 shows an exploded view of a link of such a track.

The parts shown in black in FIG. 1 are made of rubber.

We can see in FIG. 1 that the links 101 are not linked directly to one another. They are joined by means of pins 102 and connectors 103.

Thus, each link 101 incorporates two parallel drill holes that each receives a pin 102. The link is, furthermore, formed of two identical bodies 101a and 101b. Each link 101 is fastened to another link by means of connectors 103 that link two pins 102 of two adjacent links. FIG. 1 shows such an assembly.

The ends of the pins 102 in fact protrude from the external edges of the links 101 thereby enabling the connectors 103 to be fixed. Each link 101 is thus fixed to an adjacent link by two end connectors 103.

Each link 101 is also fixed to an adjacent link by a central connector 105. This central connector incorporates two flanges 105b and 105c fixed by screws 106 and it has an extension 105a that acts as a guiding tooth for the track.

Classically (FIG. 2) the end connectors 103 comprise two cylindrical holes 103a, 103b, intended to cap the pins 102, and linked by tongues 107a, 107b. A screw 108 passes through the tongues 107a, 107b and cooperates with female threading made in one of the tongues. Tightening this screw enables the tongues 107a, 107b to be brought elastically closer together thereby tightening the connector 103 on the pins 102.

The connector 103 and the ends of the pins 102 may be provided with one or several flat sections (not shown). Such an arrangement will ensure a relative positioning of the links giving a prior flexure (pre-stressing) between adjoining links. The winding of the tracks around the sprocket wheel, the idler and the end rollers of the running gear is thereby made easier.

Classically, each pin 102 incorporates two crowns made of a synthetic material (not visible in the Figures) that cooperate with the drill holes made in the bodies 101a, 101b.

These crowns are made, more often than not, of rubber, either in a single block by duplicate molding or by stacking different concentric rings bonded to one another (rings called "adherite").

Positioned between the pin 102 and the bodies 101a, 101b of the link 101, these rings are able to absorb part of the mechanical stresses received by the links. They also enable metal on metal friction to be avoided between the pin 102 and the link 101 during the operation of the track. Indeed, such frictions would lead to the premature wear of the pins causing fractures.

Furthermore, the rubber of these rings enables different deformations for the pins 102 from one link to another during the operation of the track. The crown must therefore not slip out of functioning and they withstand by their deformation the relative torsions of the pins 102 with respect to the links 101.

Each link body 101a, 101b also incorporates a track shoe 104a, 104b formed of a metallic base covered with a synthetic material. This track shoe is intended to be in contact with the ground. It is fixed to the body by nuts 109 that cooperate with threaded rods 110 integral with the bases (FIG. 2).

Lastly, each body 101a, 101b carries a layer 111a, 111b of synthetic material on its upper face. This layer acts as a roll way for the rollers guiding the track.

From an operational point of view, the track is driven by the rotation of two crown gear (not shown) whose teeth mesh on either side of the links between the connectors 103. The lateral guidance of the track is ensured by guide teeth 105a that circulate in the grooves of the guiding rollers (not shown).

The assembly and disassembly of a link is made by removing or reinstalling the connectors 103 that link one link 101 to its adjoining ones.

Such a well known track suffers drawbacks.

Firstly we note that it is formed of a large number of parts. The assembly and disassembly of the links is, furthermore, complicated.

Indeed, the pins 102 must be pre-stressed before assembly. This pre-stressing is difficult to ensure in the field when the crew does not have the specific tooling. Frequent assembly and disassembly causes the premature wear of the connectors 103 thereby forming a weak point in the tracks.

The contact surface of the track shoes with the ground is relatively reduced, which results in a relatively rapid wear of the shoes which come into contact with the ground in an abrupt manner, link by link.

Lastly, with such links, it is not possible to obtain a constant distance between the pins 102 of the links. Indeed, the pins 102 are arranged relatively close to the front and rear edges of each link 101, so as to facilitate the installation of the connectors 103 and the space between the two pins of a same link must be large enough to enable the passage of the tooth of the drive gear. The unequal distance between the pins results in a winding of the track that is by surges and substantial vibrations that are communicated to the ground and to the vehicle.

SUMMARY OF THE INVENTION

The aim of the invention is to propose a new track concept that enables such drawbacks to be overcome and namely a track whose contact surface with the ground by unit length is increased, thereby reducing the wear on the track shoes.

The track according to the invention is of simple design and incorporates fewer parts than known tracks. It may be assembled and disassembled in the field without the need for specific tooling.

Lastly, the track according to the invention has a constant distance between pins that ensure the regular winding on the drive gears, thereby significantly reducing noise and vibrations.

Thus, the invention relates to a track for an all-terrain vehicle, and namely for an armored vehicle, comprising links hinged together so as to form a closed chain, each link carrying at least one body equipped with a track shoe intended to come into contact with the ground, track wherein it incorporates a row of median bodies that is arranged so as to be longitudinally offset with respect to the row of lateral bodies, each median body being thus positioned staggered between four lateral bodies, each median body being further hinged, by means of at least two parallel pins, to four lateral bodies, that is to say two lateral bodies from each lateral row, the pins being positioned at an equal distance from one another.

According to a particular embodiment, the median bodies are globally hexagonal in shape, the lateral bodies having profiles corresponding to those of the median bodies opposite which they are positioned.

The median bodies may thus be of an even hexagonal shape.

The median bodies may also be of an uneven hexagonal shape, the profiles of two adjacent lateral bodies in this case forming an angle of over 120°.

Advantageously, each median body may be formed of two half-bodies assembled together by linking means and capped by the same track shoe.

According to a particular embodiment, the two half-bodies each incorporates a tongue equipped with toothing, the toothing of one tongue cooperating with that of another after assembly to ensure a link in longitudinal traction of the two half-bodies, fastening screws will further ensure the joining of the two half-bodies.

Each half-body may carry a median guide tooth integral with the face opposing that intended to receive the track shoe.

Each median body may be hinged with the lateral bodies by means of two parallel pins, each pin incorporating a median part covered by at least one layer of an elastic material and which is integral with the median body.

The end of each pin may be made integral with a lateral body by recessed fitting.

Each link of the track may be constituted by two lateral bodies and two median half-bodies, each median half-body being made integral with the two lateral bodies by a different pin, each median half-body constituting half of a different median body.

BRIEF DESCRIPTION OF THE DRAWINGS

The invention will become more apparent from the following description of a particular embodiment, such description made with reference to the appended drawings, in which.

DETAILED DESCRIPTION OF PREFERRED EMBODIMENTS

Figure 3A:
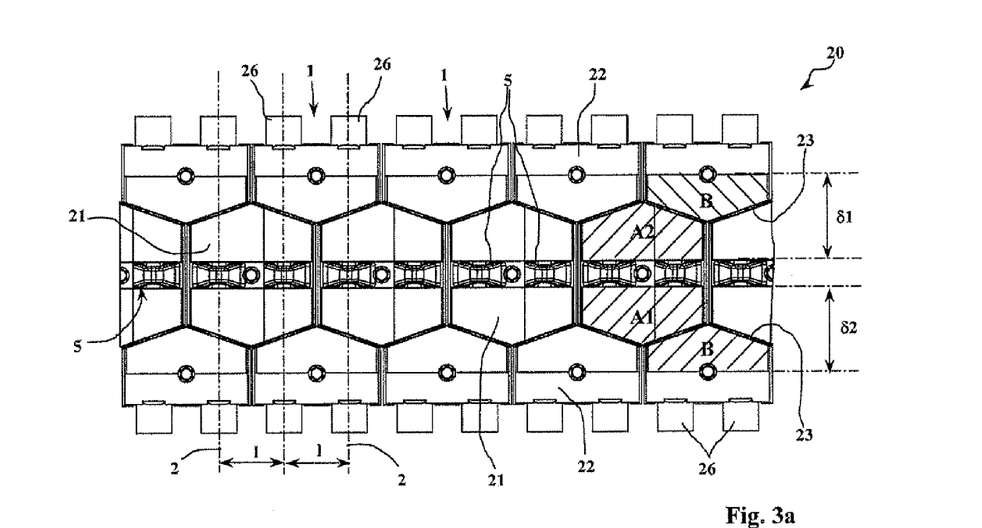
FIG. 3a is a top view of a section of track according to the invention.
Figure 3B:
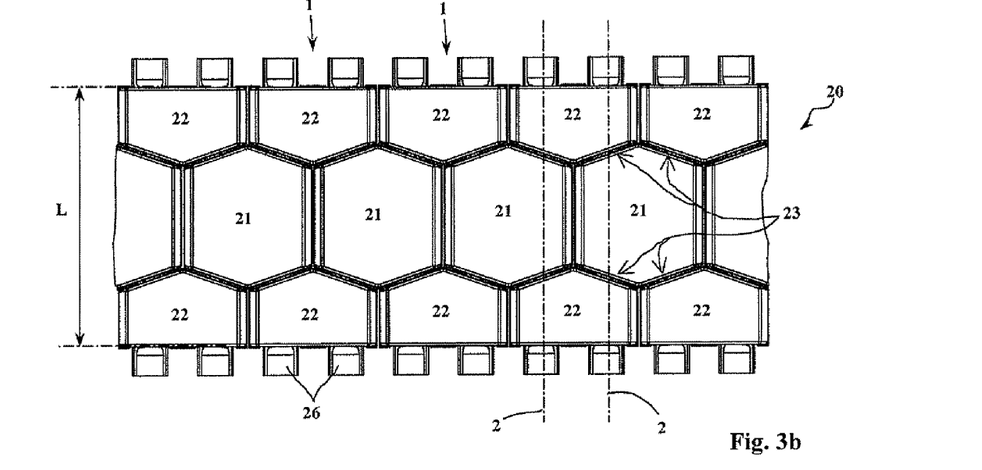
FIG. 3b is a bottom view of the same section of track.
Figure 3C:
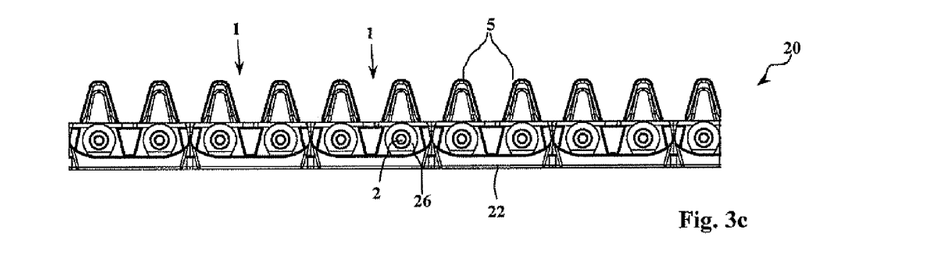
FIG. 3c is a side view of this same section of track.

With references to FIGS. 3a to 3c, a track 20 according to the invention is formed by the assembly of links 1 which are hinged to one another so as to form a closed chain.

FIG. 3b, a top view (thus of the face of the track that is in contact with the ground), more particularly shows that the track 20 comprises several bodies equipped with a track shoe intended to come into contact with the ground. The track 20 thus incorporates a row of median bodies 21 and two rows of lateral bodies 22.

The row of median bodies 21 is arranged to be longitudinally offset with respect to the rows of lateral bodies 22. Each median body 21 is thus placed staggered between four lateral bodies 22.

We see in FIGS. 3a and 3b that the median bodies 21 are globally hexagonal in shape, the lateral bodies 22 having, furthermore, profiles 23 that correspond to those of the median bodies facing which they are positioned. The space between the median bodies and the lateral bodies is thereby reduced. Such as arrangement enables an optimal contact surface to be obtained for the shoe on the ground, indeed, the shoes thus substantially cover the full width L of the track.

This configuration may be compared with that of known tracks described previously with reference to FIGS. 1 and 2 and for which the track shoes 4a, 4b only cover the widths of link bodies 101a, 101b and do not, in particular, cover the space facing the median connector 105.

Each median body 21 is furthermore hinged by means of at least two pins 2 (only the geometric axes are visible in FIGS. 3a and 3b) with four lateral bodies 22, that is to say two lateral bodies 22 for each lateral row.

We also notice in FIGS. 3a to 3c that the pins 2 all have the same distance 1 between them.

FIG. 3a, which shows a top view of the track 20, shows the median guiding teeth 5. Each median body 21 has two guiding teeth 5. FIG. 3c also shows the guiding teeth, which are equidistant from one another.

Figure 5:
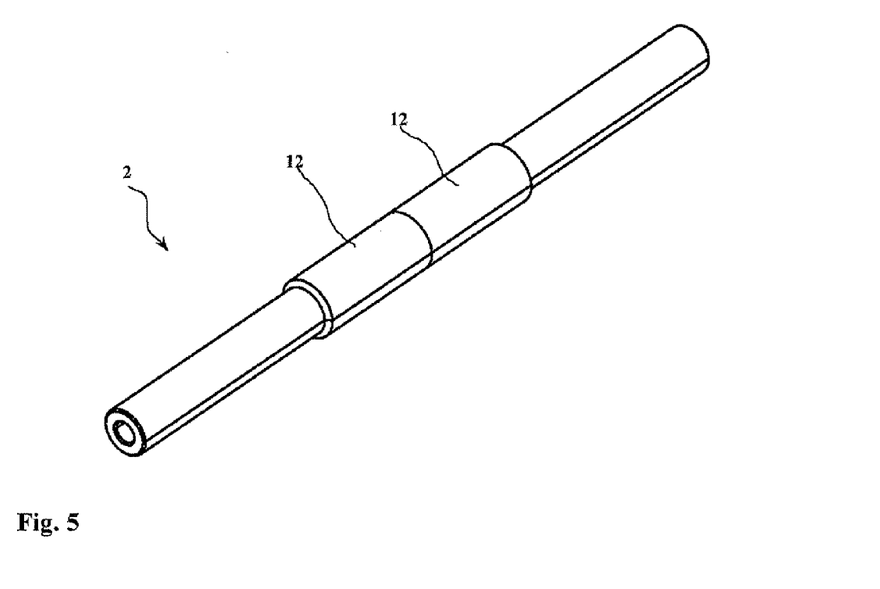
FIG. 5 is a perspective view of a pin alone.

The pins 2 enable the median body 21 to pivot with respect to the lateral bodies 22. FIG. 5 shows a pin 2 alone. Such a pin is made of steel and it incorporates at its median part one or several layers 12 of an elastic material (layers called "adherite"). This material may be rubber. This layer 12 of elastic material is integral with the median body 21. Each end of each pin 2 is furthermore made integral with a lateral body 22 by recessed fitting. This means that the ends of the pins 2 tightly fit into the drill holes receiving them in the lateral bodies 22.

We note that in FIGS. 3a and 3b the lateral bodies 22 incorporate two lateral cylindrical lugs 26 inside which the pins 2 are housed. These lugs are intended to cooperate with the teeth of a drive gear of the track as will be explained hereafter. There are two parallel drive gears, one on either side of the track for each row of lateral bodies, such gear cooperating with the lugs 26 of the lateral bodies 22.

Thus, during the functioning of the track the layer(s) of adherite 12 enable the pivoting of each pin 2 with respect to the median body 21, thus the pivoting of the median body 21 with respect to the lateral body 22.

Figure 13:
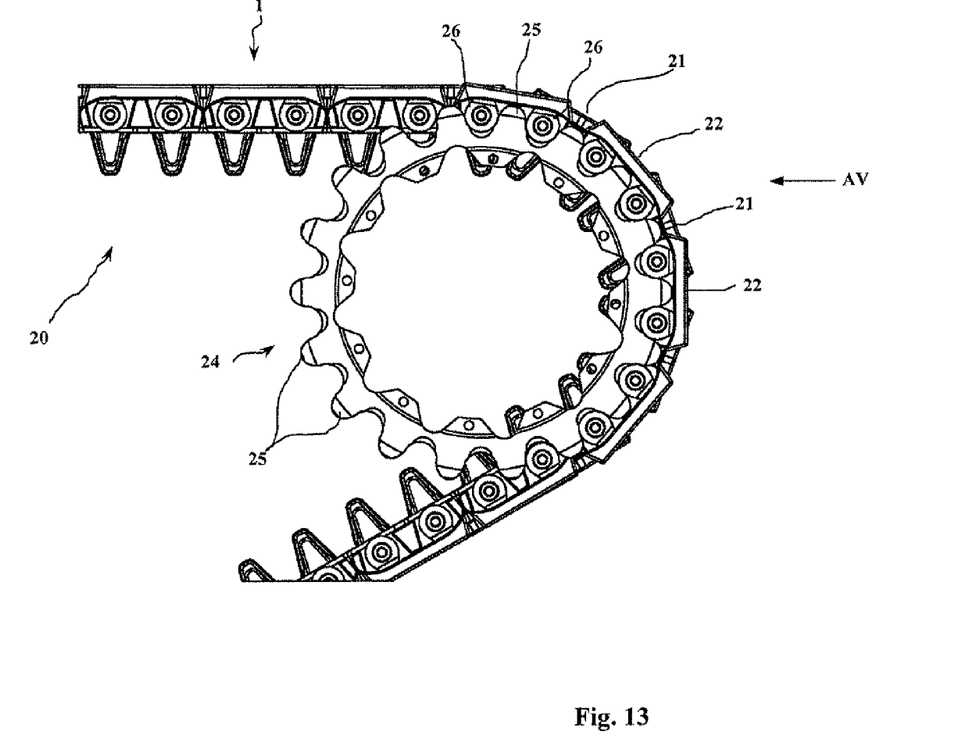
FIG. 13 is a lateral view showing the track according to the invention being driven by a crown gear integral with the motorization of a vehicle.

This pivoting is namely produced during the passage of the track over a crown gear integral with a motorization of the vehicle. FIG. 13 shows the cooperation of the track 20 with such a crown gear 24.

We note that the lugs 26 are positioned between the teeth 25 of the crown gear 24. The constant distance between their pins, ensured by the invention, further enables such distance to be relatively reduced, thereby enabling the use of a crown gear 24 having a great number of teeth.

Thus, within the scope of the application of the invention to the driving of an armored vehicle, it has been possible to implement a crown gear incorporating 18 teeth as opposed to the 12 teeth of present gear associated with tracks according to FIGS. 1 and 2. This results in more progressive drive, a reduction of the stresses, shocks, vibrations and wear on the teeth, improved reliability (track-throwing made more difficult), a reduction in energy losses linked to drive. It has been estimated that energy losses linked to the pivoting of the pins has been reduced by 35% with the track according to the invention with respect to a track according to prior art (with equivalent masses and dimensions).

We note also that the track/toothing contact of the crown gear is made at the lugs 26 which are robust parts integral with the lateral bodies 22. With known tracks, the contact is made between the connectors thereby causing the latter to wear or even fracture. Furthermore, the cylindrical form of the lugs 26 promotes the rotation between the lateral bodies 22 and the crown gear 24, thereby reducing wear by spreading the friction stresses over the cylindrical surface of the lugs.

We note in FIG. 13, to the front (AV) of the gear 24, the relative pivoting of the median bodies 21 with respect to the lateral bodies 22 during the passage of the crown gear 24. This pivoting is relatively reduced angularly thereby further contributing to the robustness of the track since the layer of adherite 12 on the pins is little stressed.

We note in FIG. 3a that each median body 21 carries two guiding teeth 5. The total number of guiding teeth is increased with the invention, thereby also improving the reliability of the track by reducing the risk of track-throwing.

The upper face of the track 20 visible in FIG. 3a is that which also acts to guide the track on the rollers (not shown). To receive the rollers, the median and lateral bodies have a layer of an elastic material (rubber). The width of these layers, thus the roll ways of the rollers, is marked by arrows δ1 and δ2.

In FIG. 3a, the parts of the bodies 21 and 22 onto which this elastic material is applied is shown by hatching. The median body 21 is thus covered over substantially all its surface, on either side of the guiding teeth 5 (zones A1 and A2). The lateral bodies 22 are covered on zones B which extend substantially over half the width of these bodies from profiles 23.

The choice of the hexagonal shape for the median bodies 21 as well as the installation of matching profiles 23 for the hexagon on the lateral bodies enables the transfer of the load from the rollers to the track to be made smoother during the passage from one body to another. Rolling comfort is thereby improved whilst maintaining a maximal contact surface with the ground.

Figure 4:
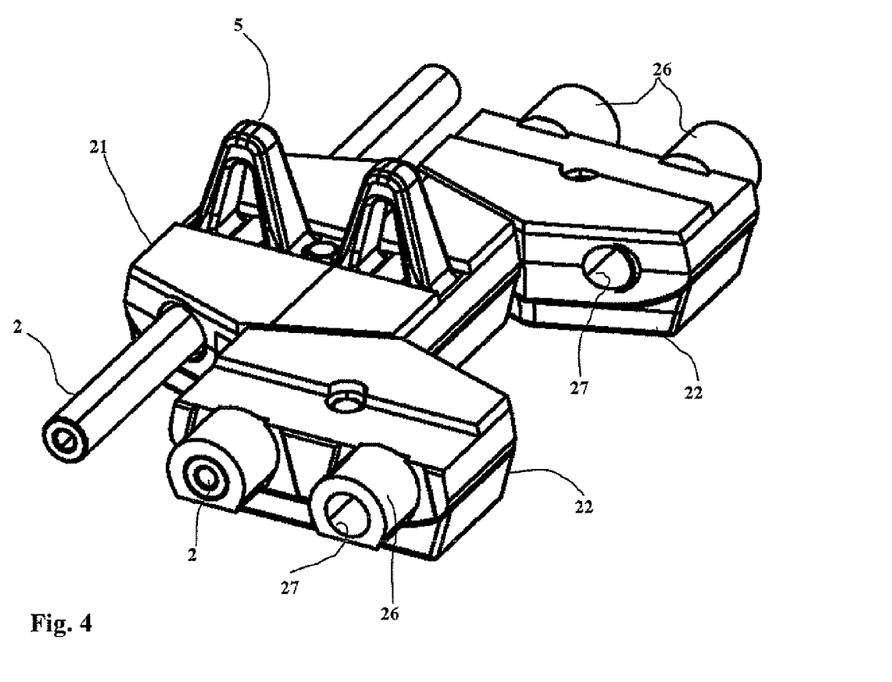
FIG. 4 is a perspective view of a pseudo link of the track according to the invention.

FIG. 4 shows the assembly of a median body 21 with two lateral bodies 22. This shows what we can call a "pseudo link", in fact it shows the basic shape whose geometric repetition forms the full track 20. This shape does not correspond, however, to the real link proposed by the invention for reasons of ease of assembly and disassembly.

This FIG. 4, however, shows a pin 2 integral with the median body 21. The other pin 2 also integral with the median body carries on each end a lateral body 22. To a certain extent, we can consider that with the invention the lateral bodies act as "connectors" for the different median bodies 21.

It is, however, clear that it is not possible to fix another median body 21 carrying its pins 2 onto the assembly shown in FIG. 4 without removing the lateral bodies 22.

Indeed, from a manufacturing point of view, we see that the median bodies carried pins 2 that were made integral by layers of adherite 12. Such an assembly can only be performed in the factory during the manufacture of the median bodies 21.

Furthermore, the pins 2 must be adjusted so as to fit tightly in the drill holes 27 in the lateral bodies 22. This, in fact, ensures the best trade-off between a certain tensile stiffness necessary for the proper functioning of the track and a certain pivotal flexibility enabling a limitation in the loss of energy required to deform the track during its passage over the crown gear.

A tight fit of the pins 2 in the drill holes 27 will advantageously be obtained by differential thermal expansion, thus also in a workshop.

These considerations have caused the architecture of the track 20 to be modified.

Figure 6:
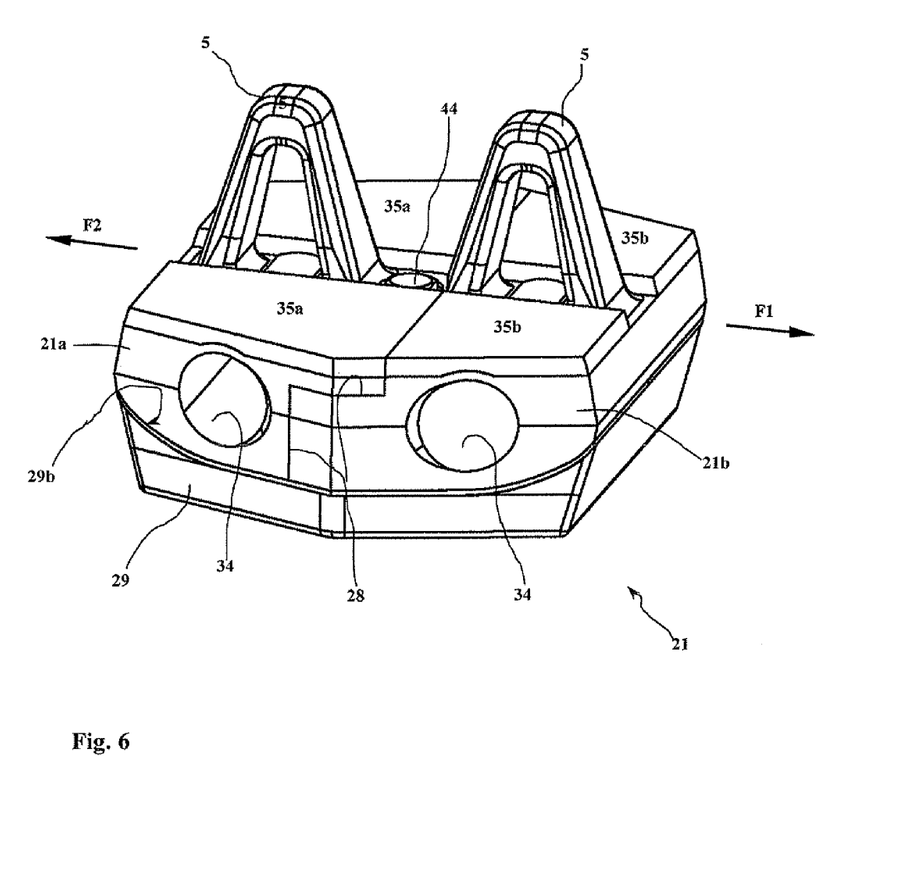
FIG. 6 is a perspective view of a median body alone.

FIG. 6 shows a perspective view of a median body 21, alone without its pins 2. This body is formed of two half-bodies 21a and 21b whose separation interface is represented in broken lines 28.

These two half-bodies 21a and 21b are assembled together by linking means (not visible in this Figure) and are capped on their lower face by a single track shoe 29. The shoe is not shown in detail, but it can be seen in FIG. 11. As in known tracks it incorporates a metallic base 29a onto which a layer of rubber is vulcanized. The track shoe 29 naturally has a hexagonal profile and this is what can be seen in FIG. 3b.

Figure 11:
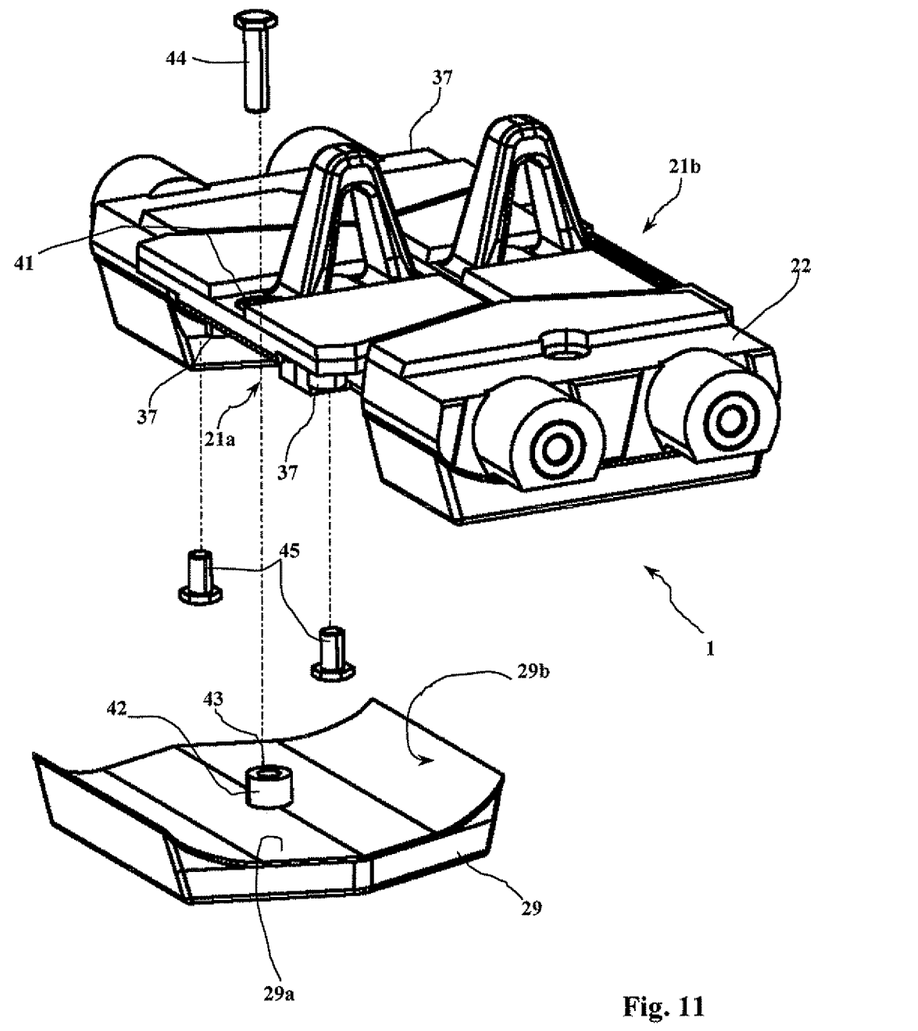
FIG. 11 is an exploded view schematizing the assembly of the links and the fastening of the track shoes on the median bodies.

We note furthermore that the metallic base 29a of the track shoe has a curved profile 29b that cooperates with a matching profile on the median body 21 (see FIGS. 6 and 11). Such an arrangement enables the rotation of the track shoe 29 with respect to the median body 21 (and along the pin of the fastening screw 44 of the base 29—see FIG. 11) to be prevented. It also enables the transmissions of the longitudinal stresses from the track shoe 29 to the median body 21.

Each half-body 21a, 21b has a median guiding tooth 5 integral with the face opposing that intended to receive the track shoe 29. Each half-body also carries a drill hole 34 intended to receive a pin 2.

Figure 8:
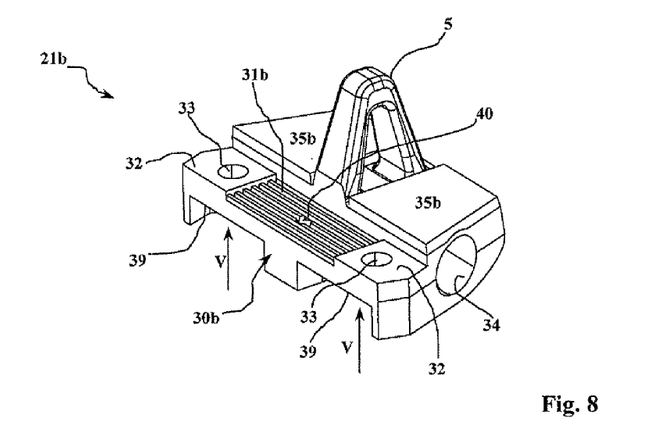
FIG. 8 is a perspective view of a first median half-body.

FIG. 8 shows the half-body 21b alone and without its pin 2. We see that this half-body incorporates a tongue 30b that is provided with teeth 31b at its median part. The zone covered with teeth is delimited at the ends of the teeth by two flat sections 32 in each one of which there is a drill hole 33. We note, furthermore, the guiding tooth 5 carried by the upper face of this half-body 21b and the drill hole 34 intended to receive a pin 2.

The upper face of each half-body carries, on either side of each tooth 5, a layer 35b of elastic material (rubber). As described previously with reference to FIG. 3a (zones A1 and A2), these layers constitute roll ways for the guiding rollers of the track.

The toothing 31b and the tongues 30b have a rectangular section profile. This toothing 31b is intended to cooperate, after the two half-bodies have been assembled, with that of a tongue 30a of the other half-body 21a to ensure a longitudinal link in traction between the two half-bodies.

By longitudinal traction we mean traction in directions F1 and F2 shown in FIG. 6, such directions being perpendicular to the drill holes 34. This traction is the main stress to which the track is subjected during its functioning.

Figure 9A:
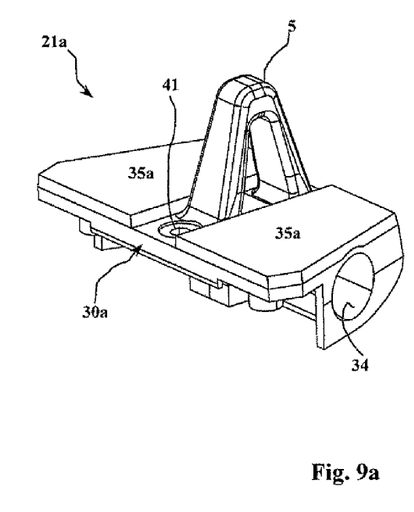
FIGS. 9a and 9b are two perspective views (top view and bottom view) of a second median half-body intended to be assembled with the first median half-body.
Figure 9B:
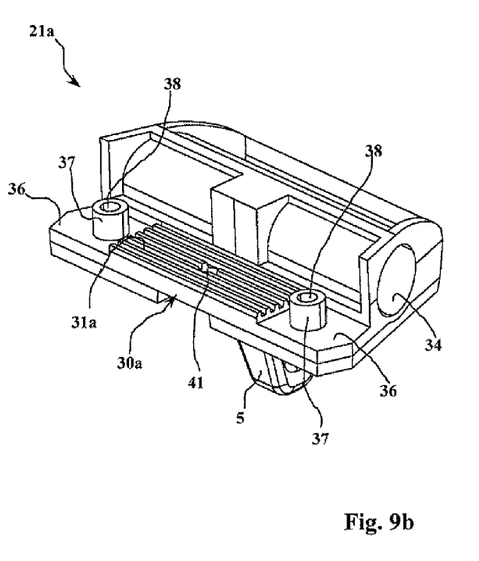

FIGS. 9a and 9b, according to two symmetrical views, show the half-body 21a alone and without its pin 2.

We note that it carries a tongue 30a as well as toothing 31a. We note more particularly in FIG. 9b that the tongue 30a incorporates flat sections 36, on either side of toothing 31a, flat sections onto which is positioned a centering spigot 37. During the assembly to the two half-bodies 21a and 21b, the spigots 37 of the half-bodies 21a are housed in the drill holes 33 in the half-bodies 21b thereby enabling the toothing 31a to be correctly positioned with respect to the toothing 31b.

When the assembly has been made, the flat sections 36 are in contact with the flat sections 32. The spigots 37 have axial female threading 38 intended to receive a screw (not shown in this Figure, the screws 45 can be seen in FIG. 11) that completes the assembly of the two half-bodies. The screw is introduced into the drill hole 33 by its lower face of the half-body 21b.

In FIG. 8, arrows V represent the directions in which the fastening screws are introduced. The heads of these screws are housed in recesses 39 and will be masked by the track shoe 29 once the latter has been fixed in place. We note in FIG. 10b (which shows the lower face of the half-body 21b) that the drill holes 33 finish by a hole 33b of more reduced diameter, this in order to retain the fastening screw head. The linking means for the two half-bodies 21a and 21b is thus constituted by the two screws 45 as well as by toothing 31a and 31b.

Lastly we note in FIG. 8 a hole 40 positioned in the toothing 31b. This hole is placed opposite a matching hole 41 in the other half-body 21a (FIGS. 9a and 9b). These holes 40, 41 enable the passage of a screw (not shown in this Figure, screw 44 being visible in FIG. 11). This screw enables to track shoe 29 to be attached once the two half-bodies have been assembled.

FIG. 11 locates the screws with respect to the link 1 and the track shoe 29. The latter incorporates a metallic base 29a covered by a vulcanized layer of synthetic material 29b.

We see in this Figure that the base 29a incorporates a central spigot 42 in which female threading 43 has been made. The screw 44 is positioned in the hole 41, it also passes through the hole 40 in the other half-body (not shown in FIG. 11) and engages in the threading 43 in the base 29a.

FIG. 11 also shows two screws 45 intended to engage in female threading in spigots 37 in the half-body 21a to complete the assembly as described previously.

Figure 7A:
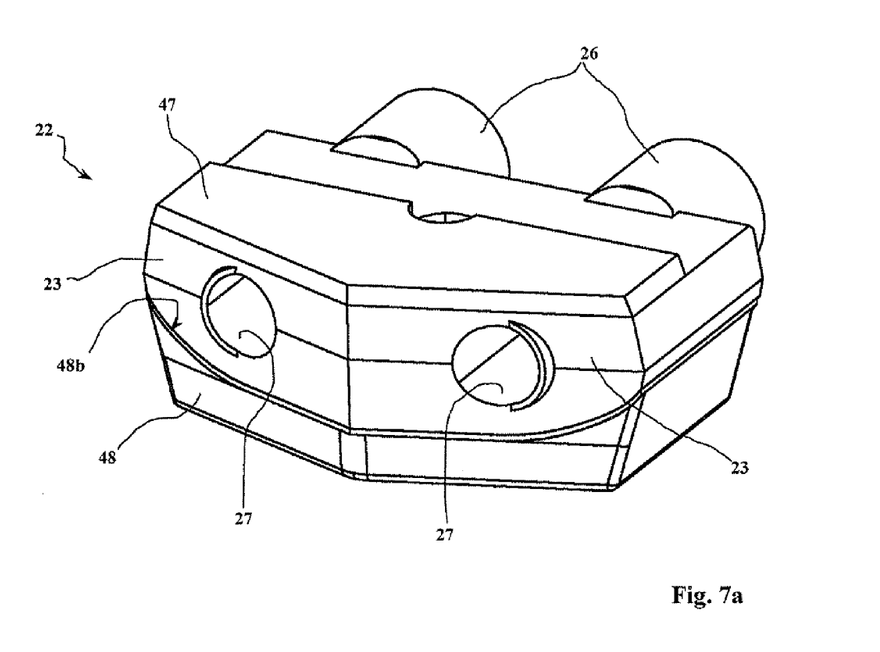
FIGS. 7a and 7b are two perspective views of a lateral body alone.
Figure 7B:
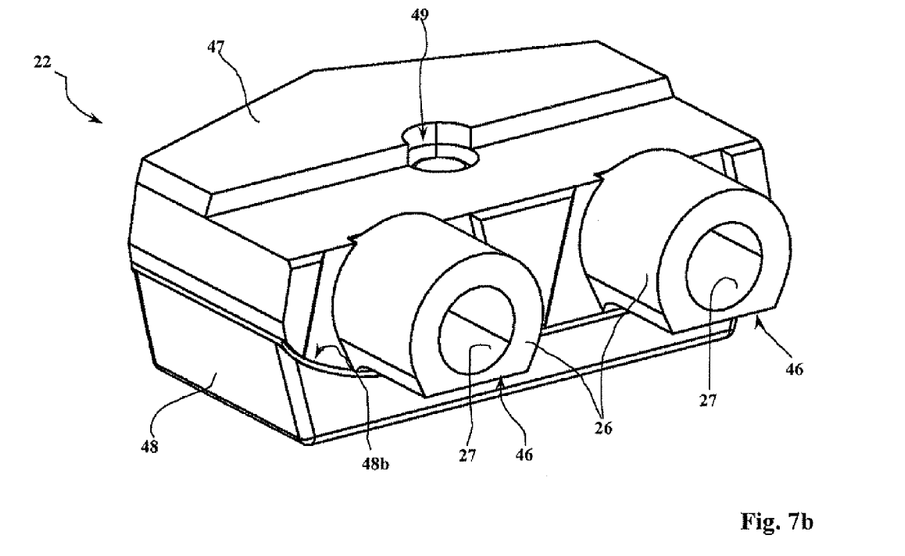

FIGS. 7a and 7b show a lateral body 22 without its pins 2 according to two different orientations. This body incorporates a single-piece base of a shape incorporating plane profiles 23 cooperating with the hexagonal forms of the central bodies. On the upper face of this base there is a layer 47 of an elastic material (rubber). As described previously with reference to FIG. 3a (zone B), this layer constitutes (with layers 35a and 35b of the median body 21) the roll way for a guiding roller of the track.

The base of the lateral body 22 has a lower shoe 48 that is of a different shape but of a structure analogous to that of track shoe 29. It namely incorporates a metallic base onto which a layer of rubber has been vulcanized and is provided with female threading enabling it to be assembled and disassembled to enable worn track shoes to be replaced.

The metallic base of the track shoe 48a also has a curved profile 48b that cooperates with a matching profile of the lateral body 22 (see FIGS. 7a, 7b). Such an arrangement enables any rotation of the track shoe 48 with respect to the lateral body 22 (or along the axis of the pin attaching this base) to be prevented and also enables the longitudinal stresses to be transmitted from the shoe 48 to the lateral body 22.

Figure 12A:
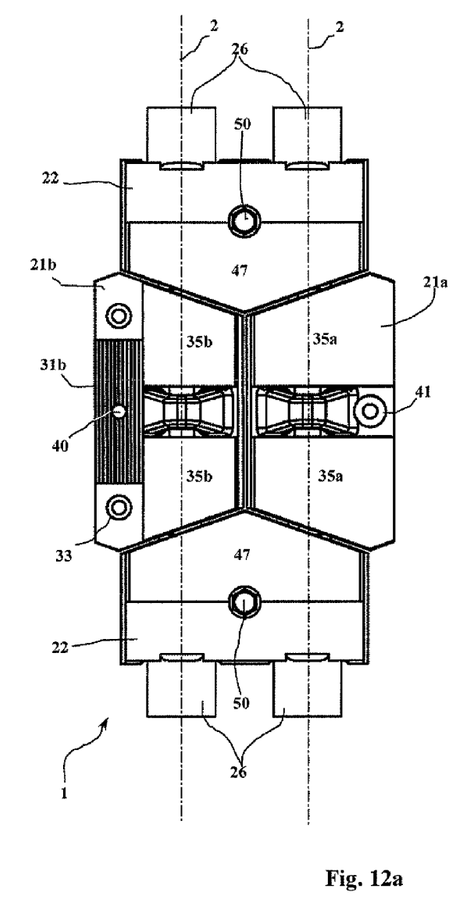
FIGS. 12a and 12b are two views of a link of the track according to the invention, FIG. 12a being a top view and FIG. 12b a bottom view.
Figure 12B:
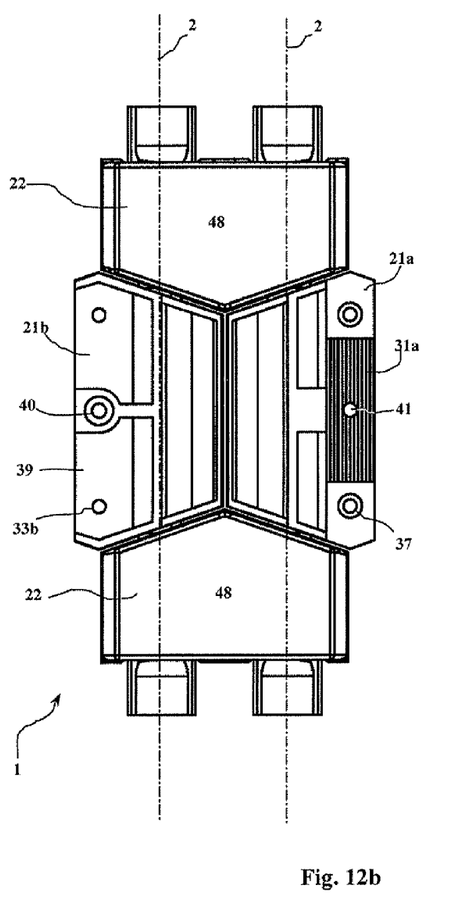

A screw to attach the shoe passes through the lateral body 22 through a drill hole 49 to fit in the female threading in the shoe (screw not visible in this Figure, the screw head 50 can be seen in FIG. 12a). The drill hole 49 passes substantially via the centre of gravity of the shoe 48 so as to limit the stresses received by the screw during functioning.

We can see in FIGS. 7a and 7b the lateral cylindrical lugs 26 as well as their drill holes 27 intended to receive the pins 2 (tightly fitted). These lugs incorporate a flat section 46 to reduce their mass.

As has already been explained, the most complex assembly phases of the link 1 are those of the installation of the pins 2. Indeed, the latter are linked to the median body 21 by their layers of adherite 12 and are joined to the lateral bodies 22 by their tight fit.

All these phases are performed in the workshop and lead to the production of a link 1 according to the invention and as shown in FIGS. 10a, 10b and 12a, 12b.

Such a link is constituted by two lateral bodies 22 and two median half-bodies 21a, 21b. Each median half-body 21a, 21b is made integral with the two lateral bodies 22 by a different pin 2. Each median half-body 21a or 21b thus constitutes half of a different median body 21.

Note that the end faces of the pins 2 are coplanar with the ends of the lugs 26. This results in a simplified assembly of the pins and the lateral bodies 22, the width-wise setting of the links 1 being ensured by the simple pressing of the ends of the lugs 26 on a reference base during assembly.

The initial pre-stressing of the track is controlled during the assembly of each link. For this the lateral bodies 22 merely need to be crimped on the pins 2 at the required angle with respect to the median half-bodies 21a, 21b. This angle is given in the factory during the assembly of each link, it is therefore no longer necessary for prior pre-stressing to be made in the field during the assembly of one link to another using connectors. It is in fact the simple screwing of the median half-bodies 21a and 21b of one link with respect to an adjacent one that will give the pre-stressing.

The links are thus assembled together extremely simply by the two screws 45 (FIG. 11) which enables one half-body 21a carried by one link 1 to be linked to a half-body 21b carried by another link 1.

After two links 1 have been joined together, the track shoe 29 is fastened into position thereby completing the median body 21 obtained by this assembly. Disassembly is equally easy.

These operations may be easily and quickly performed in the field without the need for specific tooling.

Note that the assembly screws 45 of these half-bodies 21a and 21b are protected by the track shoe 29 thereby facilitating their subsequent disassembly.

The track shoes 29 are fastened by a single screw 44 housed in the hole 41 of the half-body 21a (see FIG. 6). Once the links 1 have been assembled, this screw is also well protected between two guide teeth 5. Note that the screw 44 to attach the track shoe 29 passes through the median body 21 via a drill hole that passes substantially through the centre of gravity of the shoe 29. The stresses received by this screw during functioning are thus reduced.

By way of a variant, it will be possible to define linking means between the median half-bodies 21a and 21b that are of a different structure.

It is also possible for a track to be produced in which the median bodies are not hexagonal but square or rectangular. However, such a solution, if it facilitates the assembly/disassembly and increases the contact surface with the ground, does not permit the very gradual passage of the rollers.

FIGS. 14a, 14b, 15a, 15b and 16 show a track 20 according to a variant embodiment of the invention. This variant differs from the previous embodiment only in the shape of the median bodies 21 as well as in the shape of the lateral bodies 22.

Note (in particular in FIG. 14b) that, if the median bodies 22 are still hexagonal (quadrilaterals with six sides), the hexagons are no longer regular (their sides and angles are no longer equal).

Thus, the sides of the hexagons of the median bodies 21 that face the profiles 23 of the lateral bodies form an angle β greater than 120° (the angle which corresponds to a regular hexagon such as that shown in the previous embodiment). This angle β is, here, equal to 170°. As can be seen in FIG. 14b, angle β is also the angle between the profiles 23 and the two adjacent lateral bodies 22.

As for the previous one, such an arrangement ensures rolling continuity whilst making the transfer of the stresses from the rollers to the track smoother when passing from one body to another. The rolling comfort of the track is ensured and the contact surface with the ground remains maximal.

All the elements forming the track are otherwise identical to those previously described and it is therefore unnecessary for them to be described anew. This variant incorporates in particular the same structure for the median body 21 in the form of two half-bodies 21a and 21b. One link is joined to another adjacent link by means of tongues 30a, 30b provided with toothing 31a and 31b on each half-body. The toothing of one tongue thus cooperates with that of another tongue after assembly to ensure a link in longitudinal traction of the two half-bodies 21a and 21b.

Attachment screws 45 further ensure the joining of the two half-bodies 21a and 21b and the half-bodies are capped after assembly by a single track shoe 29.

Figure 14A:
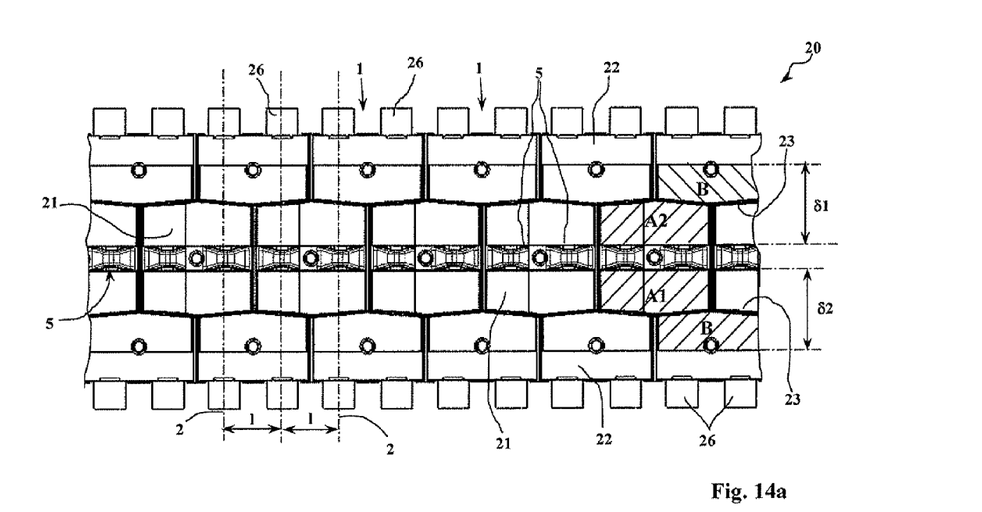
FIGS. 14a and 14b are analogical views respectively to FIGS. 3a and 3b and show the top (FIG. 14a) and bottom (FIG. 14b) of a section of track according to a variant embodiment of the invention.
Figure 14B:
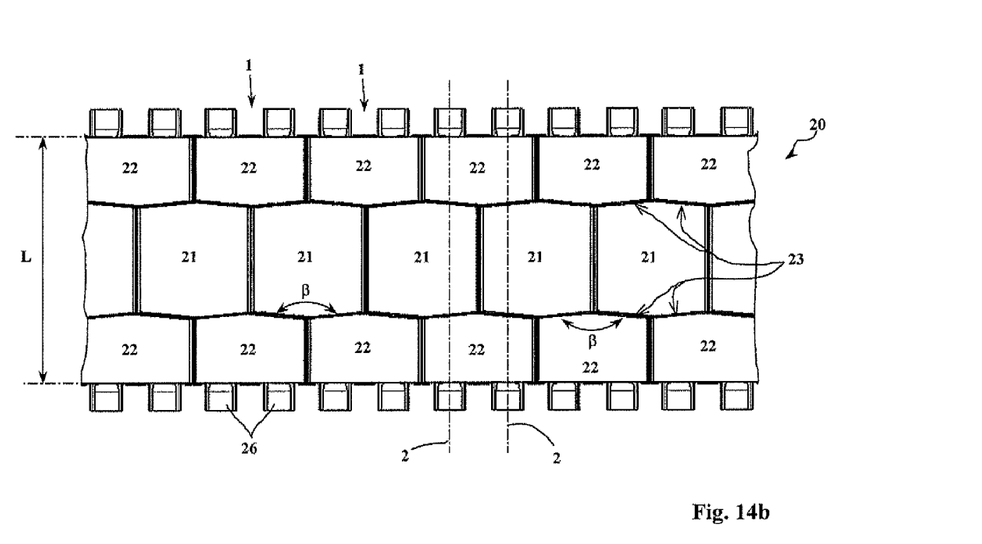

FIGS. 14a and 14b are thus analogous to FIGS. 3a and 3b described previously. FIG. 3c has not been reproduced since it would be identical in this variant embodiment.

Figure 15A:
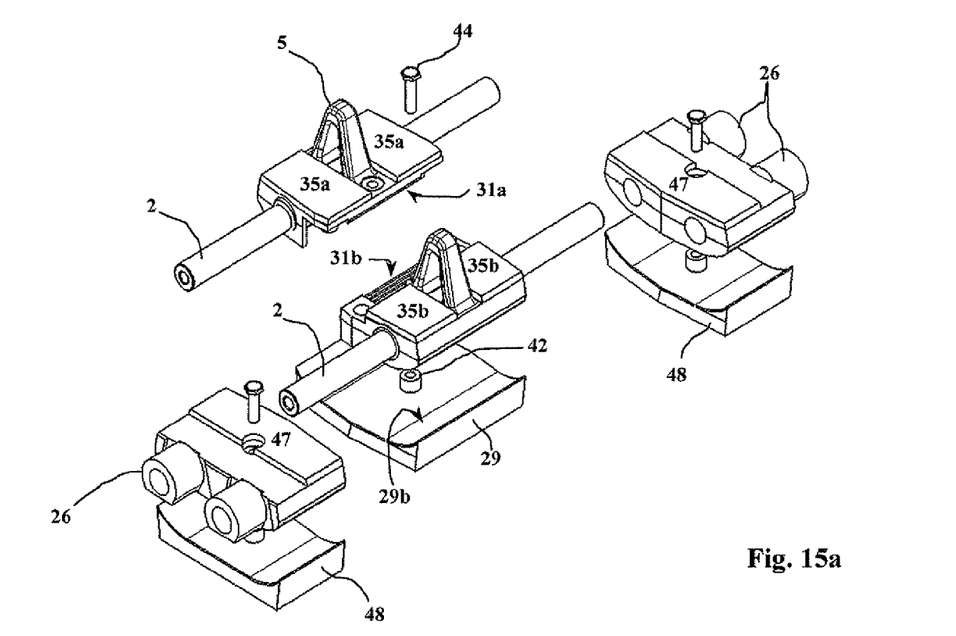
FIG. 15a shows an exploded perspective view of a pseudo link of a track according to this variant embodiment.
Figure 15B:
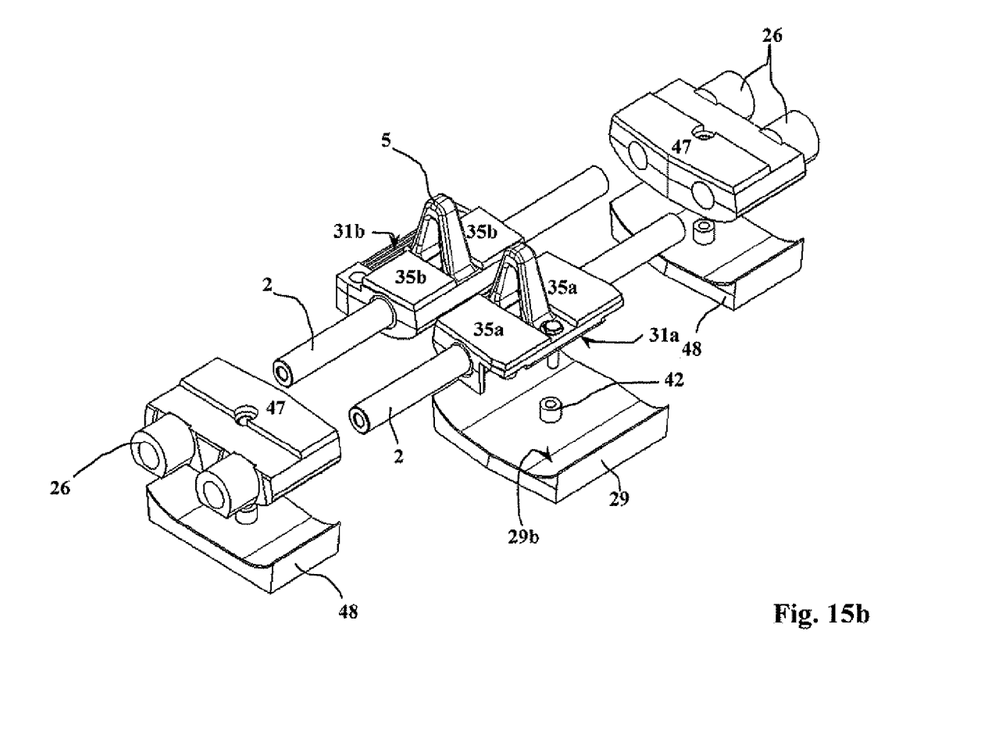
FIG. 15b shows an exploded perspective view of a link of a track according to this variant embodiment.

FIGS. 15a and 15b show an exploded view of the assembly of the links in this variant.

FIG. 15a more particularly shows a pseudo link (as shown in FIG. 4). The track shoe 29 being positioned below the two half-bodies 21a and 21b which will be assembled together by toothing 31a and 31b.

Figure 10A:
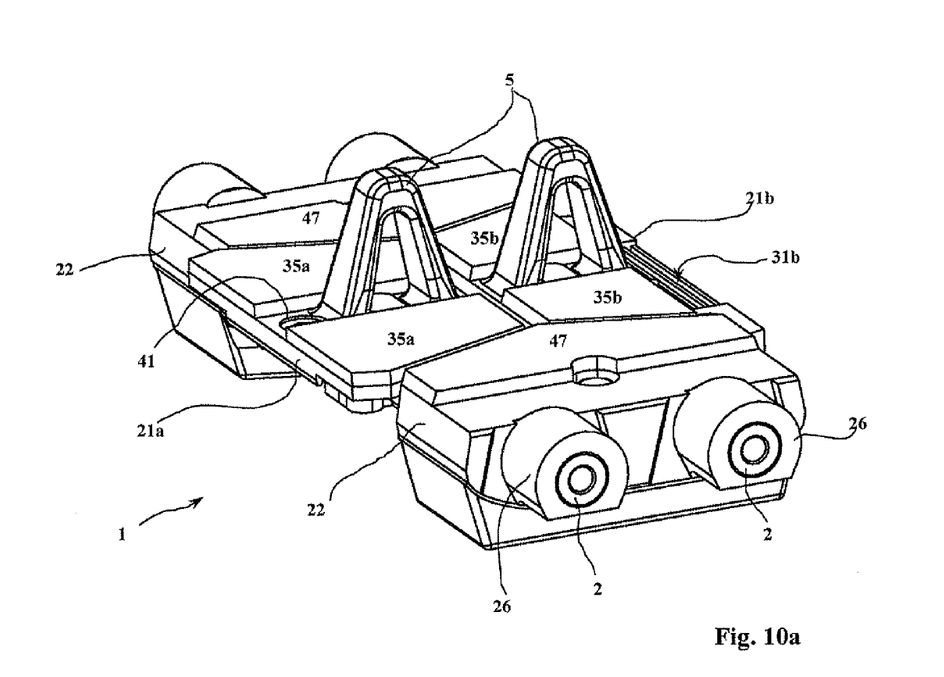
FIGS. 10a and 10b are two perspective views of a link of the track according to the invention, FIG. 10a being a top view and FIG. 10b being a bottom view.
Figure 10B:
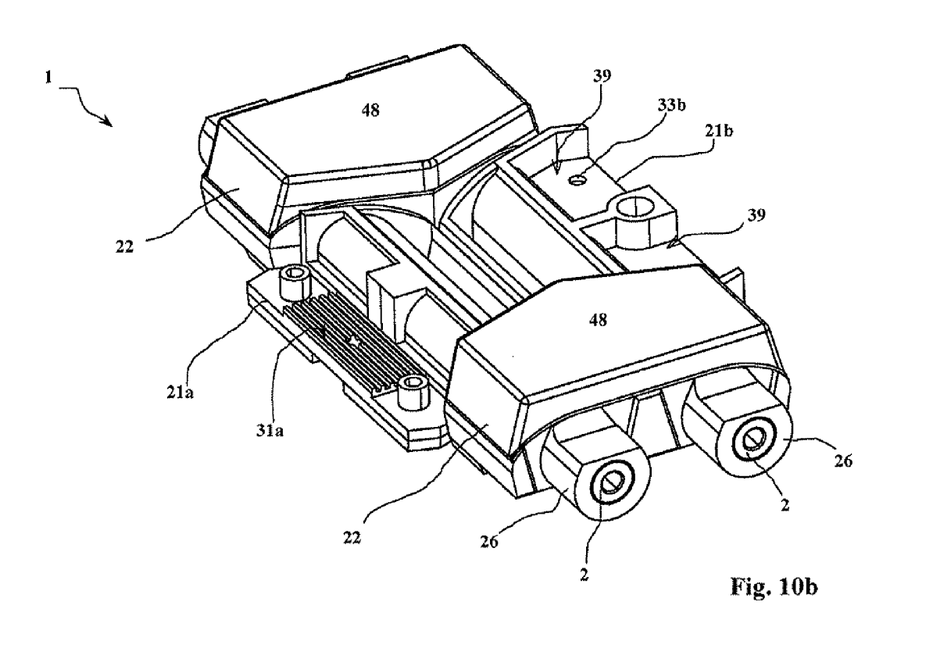
Figure 16:
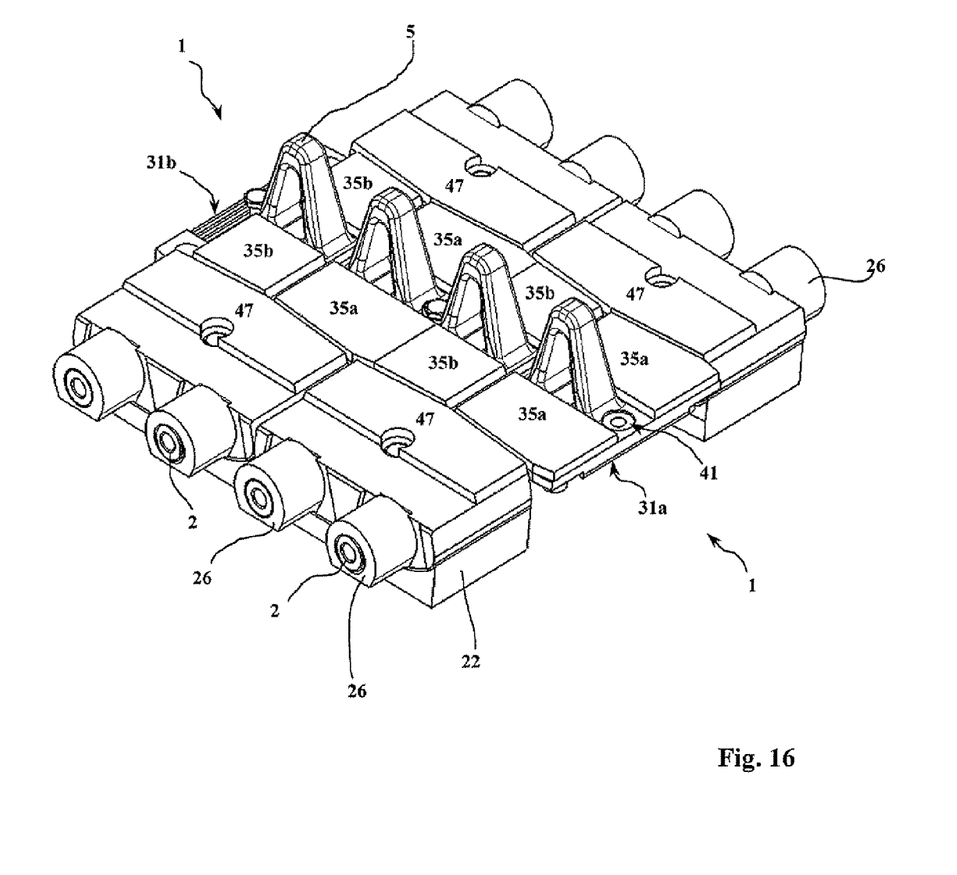
FIG. 16 shows a perspective top view of two assembled links of a track according to this variant embodiment.

FIG. 15b shows a real link (as shown in FIGS. 10a and 10b). Lastly, FIG. 16 shows a perspective view of two real links joined to one another.

What is claimed is:

1. A track for an all-terrain vehicle, comprising:
   links hinged together forming a closed chain;
   two rows of lateral bodies and one row of median bodies that is arranged so as to be longitudinally offset with respect to the two rows of lateral bodies;
   track shoes configured to come into contact with the ground, each shoe being fixed to a face of one of said lateral and median bodies; and
   pins linked to said lateral and median bodies, each pin being equally spaced from adjacent pins along an entirety of the track, wherein
   each of the median bodies is positioned staggered between four of the lateral bodies, each of the median bodies is hinged by two parallel pins to the four lateral bodies, and each median body is hinged to two lateral bodies from each row of lateral bodies by one of the parallel pins,
   each of the median bodies comprises two half-bodies that each comprise a tongue equipped with toothing, the two half-bodies are capped by the same track shoe which is able to be disassembled from the median body,
   the two half-bodies are joined together by the toothing of the tongues ensuring a link in longitudinal traction after assembly of the two half bodies, the two half-bodies are joined together by fastening screws, and
   the two half-bodies are able to be disassembled.

2. A track according to claim 1, wherein
   the face configured to receive the track shoe of each median body is hexagonal in shape, and
   the lateral bodies have faces configured to receive the track shoe, the faces forming profiles corresponding to those of the median bodies adjacent to which they are positioned.

3. A track according to claim 2, wherein the face configured to receive the track shoe of each median body is of a regular hexagonal shape.

4. A track according to claim 2, wherein the face configured to receive the track shoe of each median body is an uneven hexagonal shape, the profiles of two adjacent lateral bodies forming an angle of over 120°.

5. A track according to claim 1, wherein each half-body comprises a median guide tooth formed integral with a side of the half-body opposite to the face that is intended to receive the track shoe.

6. A track according to claim 1, wherein each pin comprises a median part comprising at least one layer of an elastic material and which is integral with the median body.

7. A track according to claim 6, wherein the end of each pin is made integral with at least one of the lateral bodies by a recessed fitting.

8. A track according to claim 1, wherein each link of the track defines two of the lateral bodies each linked with two of the median half-bodies by two of the pins, a first and second half-body of the median half-bodies being made integral with a first and second lateral bodies of the lateral bodies respectively by a first and second pin of the pins, each of the first and second half-bodies being part of a distinct median body of the median bodies.

9. A track according to claim 8 wherein each half-body comprises a median guide tooth formed integral with a side of the half-body opposite to the face that is intended to receive the track shoe.

10. A track according to claim 1, wherein the all-terrain vehicle comprises at least one crown gear driving the track.

11. A track according to claim 1, wherein the fastening screws joining the two half-bodies are each introduced into a hole by a lower face of one of the half-bodies.

12. A track according to claim 11, wherein the fastening screws joining the two half-bodies together are capped after assembly by the same track shoe.

13. A track according to claim 12, wherein the same track shoe is assembled or disassembled by one fastening screw.

14. A track according to claim 1, wherein the two half-bodies joined by the fastening screws are disassembled by removing the fastening screws.

15. A track according to claim 1, wherein the all-terrain vehicle is an armored vehicle.

* * * * *

UNITED STATES PATENT AND TRADEMARK OFFICE
CERTIFICATE OF CORRECTION

PATENT NO. : 8,789,898 B2  Page 1 of 1
APPLICATION NO. : 13/039947
DATED : July 29, 2014
INVENTOR(S) : Frederic Bonnetain et al.

It is certified that error appears in the above-identified patent and that said Letters Patent is hereby corrected as shown below:

On the Title Page
Item (73) Assignee should read: Nexter Systems, Roanne (FR)

Signed and Sealed this
Twenty-eighth Day of October, 2014

Michelle K. Lee
*Deputy Director of the United States Patent and Trademark Office*